United States Patent [19]

Ishikawa et al.

[11] Patent Number: 5,099,109
[45] Date of Patent: Mar. 24, 1992

[54] OPTICAL READER WITH REDUCED REGULAR REFLECTION ERRORS

[75] Inventors: Hiroshi Ishikawa, Furukawa; Ichiro Morishita, Iwanuma, both of Japan

[73] Assignee: Alps Electric Co., Ltd., Tokyo, Japan

[21] Appl. No.: 681,633

[22] Filed: Apr. 2, 1991

Related U.S. Application Data

[63] Continuation of Ser. No. 206,461, Jun. 13, 1988, abandoned.

[30] Foreign Application Priority Data

Aug. 5, 1987 [JP] Japan ............... 62-197038
Jan. 16, 1988 [JP] Japan ............... 63-7351

[51] Int. Cl.$^5$ ............... G06K 7/10; G06K 7/01
[52] U.S. Cl. ............... 235/462; 235/472
[58] Field of Search ............... 235/462, 472, 454; 369/112, 44.23; 350/437

[56] References Cited

U.S. PATENT DOCUMENTS

| | | | |
|---|---|---|---|
| 2,811,081 | 10/1957 | Praeger | 350/437 |
| 4,143,809 | 3/1979 | Uebbing et al. | 235/472 |
| 4,346,292 | 8/1982 | Routt et al. | 235/462 |
| 4,528,444 | 7/1985 | Hara et al. | 235/462 |
| 4,560,862 | 12/1985 | Eastman et al. | 235/462 |
| 4,631,397 | 12/1986 | Ohsato et al. | 369/112 |
| 4,675,531 | 6/1987 | Clark et al. | 235/472 |
| 4,678,288 | 7/1987 | Lonsdale et al. | 235/472 |
| 4,818,886 | 4/1989 | Drucker | 235/462 |
| 4,843,222 | 6/1989 | Hochgraf | 235/462 |

*Primary Examiner*—Robert Weinhardt
*Attorney, Agent, or Firm*—Guy W. Shoup; David H. Carroll; Paul J. Winters

[57] ABSTRACT

An optical reader which has a light emitting element, a photodetector, a light emitting side lens for converging a light emitted from the light emitting element to a surface to be detected, and a photodetecting side lens for converging a light reflected on the surface to be detected to the photodetector, wherein the light emitting side focus point focused at the light emitting element by the light emitting side lens is set at a position separated from the lens farther than the photodetecting side focus point focused at the photodetector by the photodetecting side lens. Thus, the adverse influence of a regular reflection light can be prevented in a small-sized structure and a detecting accuracy can be enhanced without decreasing the light detecting efficiency of the optical reader.

10 Claims, 13 Drawing Sheets

FIG.12
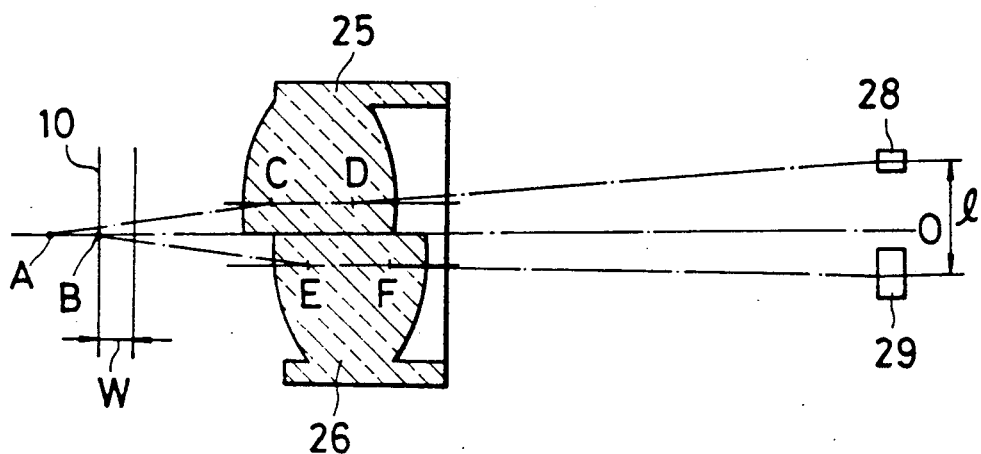
FIG.13   FIG.14
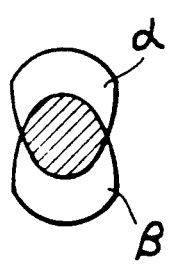  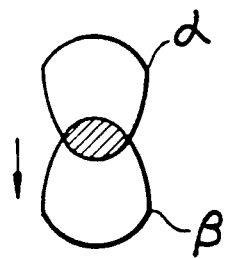

| | |
|---|---|
| $\ell_1$ | 0.55 |
| $\ell_2$ | 0.55 |
| $L_1$ | 6.6 |
| $L_2$ | 3.8 |
| $P_1$ | 6.2 |
| $P_2$ | 4.0 |
| d | 2.0 |

FIG.21

ELEMENT SIDE

| | |
|---|---|
| $R_1$ | 2.40 |
| $R_2$ | -2.40 |
| K | -8.2 |
| D | $5.0 \times 10^{-2}$ |
| E | $-2.8 \times 10^{-2}$ |
| F | $8.5 \times 10^{-3}$ |
| G | $-1.3 \times 10^{-3}$ |

DETECTION SURFACE SIDE

| | |
|---|---|
| $R_1$ | 2.40 |
| $R_2$ | -2.40 |
| K | -0.8 |
| D | $-1.4 \times 10^{-2}$ |
| E | $5.5 \times 10^{-3}$ |
| F | $-1.5 \times 10^{-3}$ |
| G | $2.2 \times 10^{-4}$ |

| | |
|---|---|
| d | 2.0 |
| N | 1.488 |

FIG.22

ELEMENT SIDE

| | |
|---|---|
| $R_1$ | 2.40 |
| $R_2$ | -2.40 |
| K | -4 |
| D | 0 |
| E | 0 |
| F | 0 |
| G | 0 |

DETECTION SURFACE SIDE (SPHERICAL SURFACE)

| | |
|---|---|
| $R_1$ | 2.40 |
| $R_2$ | -2.40 |
| K | 0 |
| D | 0 |
| E | 0 |
| F | 0 |
| G | 0 |

| | |
|---|---|
| d | 2.0 |
| N | 1.488 |

OPTICAL READER WITH REDUCED REGULAR REFLECTION ERRORS

This application is a continuation of application Ser. No. 07/206,461, filed June 13, 1988 now abandoned.

BACKGROUND OF THE INVENTION

1. Field of the Invention

This invention relates to an optical reader for use in the detection and the read of an optical mark displayed on a medium, such as a bar code reader or an image scanner and, more particularly, to an optical reader which can prevent the reading accuracy from decreasing due to normal reflection of a light on a recording surface and read a wide detecting range in a small size efficiently.

2. Description of the Prior Art

FIG. 23 is a sectional view of a conventional optical reader for use in a bar code reader, and FIG. 24 is an explanatory view showing the optical reading operation of a configuration in FIG. 23. This optical reader is of the same type as that disclosed, for example, in Japanese Utility Model Publication No. 2689/1987 (Corresponding to U.S. Pat. No. 4,143,809) or Japanese Utility Model Publication No. 11813/1986.

In this optical reader, a photoreflector 5 in which a light emitting element 2 and a photodetector 3 are integrated on a substrate 4 is contained in a case 1. An integral lens 6 is provided in the case 1. The lens 6 is formed by integrating a light emitting side lens 7 and a photodetecting side lens 8. Both the lenses 7 and 8 are of non-spherical lenses in such a manner that the optical axes a and b of the lenses 7 and 8 cross each other near a reading point X. The lenses 7 and 8 are so disposed that the centers of the light emitting element and the photodetector are located on the extension lines of the optical axes a and b.

In this optical reader, a light emitted from the light emitting element 2 is condensed by the lens 7, and focused at the reading point X. This light is reflected from a surface 10 to be detected, converged by the lens 8, and detected by the photodetector 3. On the surface 10 to be detected, the light is absorbed by black bars 11, and reflected by white spaces 12. The bar code is read by the variation in the detecting level of the reflected light.

As shown in FIGS. 23 and 24, the optical reader in which the light emitting side lens 7 and the photodetecting side lens 8 are integrally provided and the lenses 7 and 8 are aligned on the same substrate 4 can be reduced in size and is adapted for use in a bar code reader.

However, the optical reader of the above-mentioned construction has a drawback that a reading error feasibly occurs when reading the bar code by disposing the center line O substantially perpendicularly with respect to the recorded surface 10. The reason is because, when the optical reader shown in FIG. 23 is disposed generally perpendicularly with respect to the recorded surface 10, most of the light rays a1 of the light emitted to the surface 10 to be detected are reflected at the same reflecting angle as the incident angle $\theta$ of the light, and the reflected light rays b1 are detected by the photodetector 3. When reading the bar code as shown in FIG. 25, the light is originally absorbed to the black bars 11, the light is reflected on the back bars 11, and the output of a photodetection signal of the photodetector 3 should exhibit waveforms as shown in FIG. 26. However, when the surface 10 to be detected on which a bar code is printed is actually enlarged, uneven waveforms as shown in FIGS. 28 and 29 are produced. The part of the light emitted to the surface 10 to be detected is reflected at random, but the other parts of the light rays of the light become, as designated by a1 and b1, the same incident and reflected angles (hereinafter referred to as "a regular reflection"). The regular reflection does not cause a drawback when the white space 12 is detected, but when the ratio of the regular reflection increases on the black bars 11, the light is not sufficiently absorbed to the black bars 11, reflected from the back bar 11, and the ratio of the light ray 1b detected by the photodetector 3 is sometimes increased. Specially when the quality of printing of the back bars 11 is wrong or when the unevenness of the surface 10 to be detected and the detected angle become a predetermined relationship, the regular reflection light from the black bars 11 is detected more by the photodetector 3. In this case, the level of the signal photodetected by the photodetector 3 is disordered as shown in FIG. 27. In some cases, there might be a possibility that an inversion occurs between the detecting level of the regular reflection light from the back bars 11 and the detecting level of the random reflection light from the white spaces 12. Even if the inversion does not occur, the detecting accuracy of the bar code is largely decreased.

To eliminate this drawback, in the prior invention disclosed, for example, in Japanese Patent Laid-open No. 62745/1976, an optical dispersion member 15 (FIG. 23), such as a diffraction grating or a semitransparent film is disposed in front of a lens so that the regular reflection light is not detected by the photodetector. However, since the entire quantity of the light detected by the photodetector 3 is decreased with this countermeasure, the reading efficiency is deteriorated to reduce the reading accuracy. In an OCR, in order to prevent the adverse influence of the regular reflection, the opposing angle of the light emitting element and the photodetector with respect to the recorded surface is altered. For example, the detected light is emitted sidewisely with respect to the surface to be detected or the photodetector is opposed generally perpendicularly to the recorded surface. However, this countermeasure means increases in size the reader, and has a drawback that cannot be employed as a detector, such as a bar code reader required for reduction in size.

SUMMARY OF THE INVENTION

Accordingly, an object of this invention is to provide an optical reader which can eliminate the above-mentioned drawbacks of the conventional optical reader and in which the adverse influence of a regular reflection light can be prevented in a small-sized structure and a detecting accuracy can be enhanced without decreasing the light detecting efficiency.

The optical axis a of a light emitting side lens and the optical axis b of a photodetecting side lens cross near a reading point X, and the centers of a light emitting element and a photodetector are disposed on the extension lines of the axes.

In the above-mentioned state, the optical axes coincide with main light rays to suppress a coma aberration.

Here, the state of the coma aberration means that, when considering the symmetry of a luminous flux near an image point, the luminous flux is symmetrical with respect to only one plane including a main light ray (one light ray passing the center of the luminous flux).

However, when the coma aberration is suppressed, a range that the intensity of the light is strong is concentrated at one point, a detectable range W is narrowed as shown in FIG. 30. When the coma aberration is suppressed, as shown in FIG. 30, the superposing area (indicated by hatching) of a detecting spot α formed by the light emitted from the light emitting element and a range β to be detected by the photodetector 3 is narrowed, there is a drawback that the detecting efficiency of the photodetector 3 is reduced at a position slightly separated from the reading point X.

Another object of this invention is to provide an optical reader which can eliminate the above-mentioned drawbacks and in which the adverse influence of a regular reflection light can be prevented in a small-sized structure and a detectable range can be increased without decreasing the light detecting efficiency.

In order to achieve the above-mentioned first object, there is provided according to first aspect of this invention an optical reader comprising a light emitting element, a photodetector, a light emitting side lens for converging a light emitted from the light emitting element to a surface to be detected, and a photodetecting side lens for converging a light reflected on the surface to be detected to the photodetector, wherein the light emitting side focus point focused at the light emitting element by the light emitting side lens is set at a position separated from the lens farther than the photodetecting side focus point focused at the photodetector by the photodetecting side lens.

In order to achieve the above-mentioned second object, there is provided according to second aspect of this invention an optical reader comprising a light emitting element, a photodetector a light emitting side lens for converging a light emitted from the light emitting element to a surface to be detected, and a photodetecting side lens for converging a light reflected on the surface to be detected to the photodetector, wherein the optical axis of the light emitting side lens and the optical axis of the photodetecting side lens are so set as to be parallel to one another, and the central positions of the light emitting element and the photodetector are disposed outside on the extension lines of the optical axes.

Since the focused position of the light emitting element by the light emitting side lens is separated farther than the focus point of the photodetecting side from the lens in the optical reader constructed according to one aspect of this invention, the light is emitted to the surface to be detected in a defocused state. When the reflected light of the light emitted in the defocused state is detected by the photodetector, the ratio of the regular reflection light of the light collected by the photodetecting side lens decreases due to the reflection from the surface to be detected. Therefore, when reading a bar code, the possibility of detecting the regular reflection light from black bars is remarkably reduced to stabilize the levels of the detection signals of the black bars and the white spaces. Since the quantity of the light detected by the photodetector is not remarkably reduced due to the reflection on the surface to be detected, the detecting efficiency is not considerably deteriorated.

Since the optical axes of the light emitting and photodetecting side lenses are set to be parallel to each other and the central positions of the light emitting element and photodetector are disposed outside on the extension lines of the optical axes in the optical reader constructed according to another aspect of this invention, the main light rays a and b are incident as oblique luminous fluxes to both the lenses. When the oblique luminous fluxes are incident to the lenses in this manner, a coma aberration occurs. Thus, the range that the intensity of the light is strong is dispersed near the surface to be detected. The ratio of the regular reflection decreases by the above-mentioned operation to stabilize the level of the detection signal. Further, the detectable range is increased so as not to considerably deteriorate the detecting efficiency.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 12 is a side view showing an optical system operated by providing a diaphragm plate;

FIGS. 13 and 14 are plan views showing a light spot and a reading range by the operation with the diaphragm plate;

FIG. 21 is a table describing the lens with characteristics shown in FIG. 19;

FIG. 22 is a table describing the lens with characteristics shown in FIG. 20;

DESCRIPTION OF THE PREFERRED EMBODIMENTS

A first embodiment of an optical reader according to the present invention will be described in detail with reference to FIGS. 1 to 17.

Figure 1:
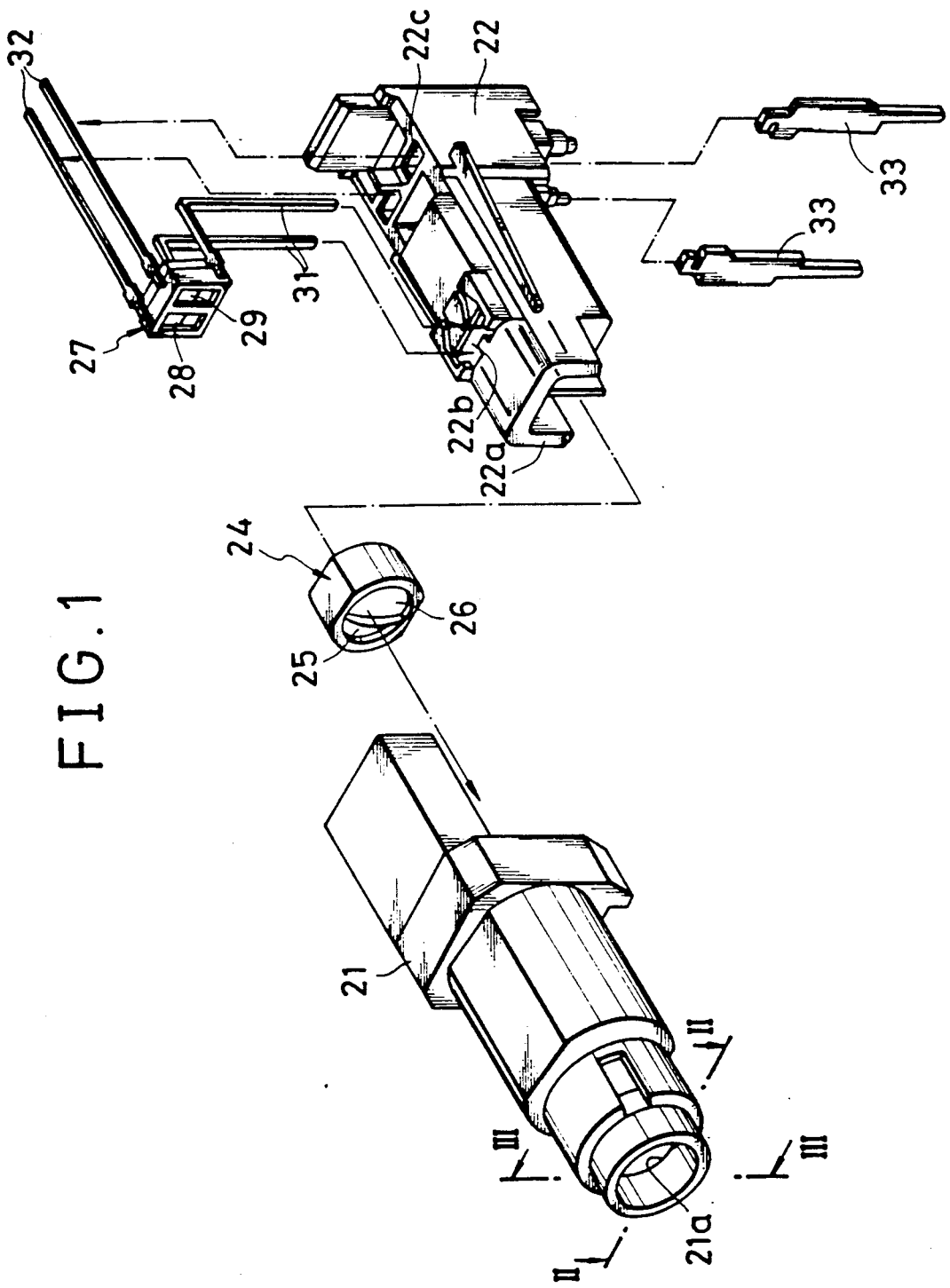
FIG. 1 is an exploded perspective view of a first embodiment of an optical reader according to the present invention.
Figure 2:
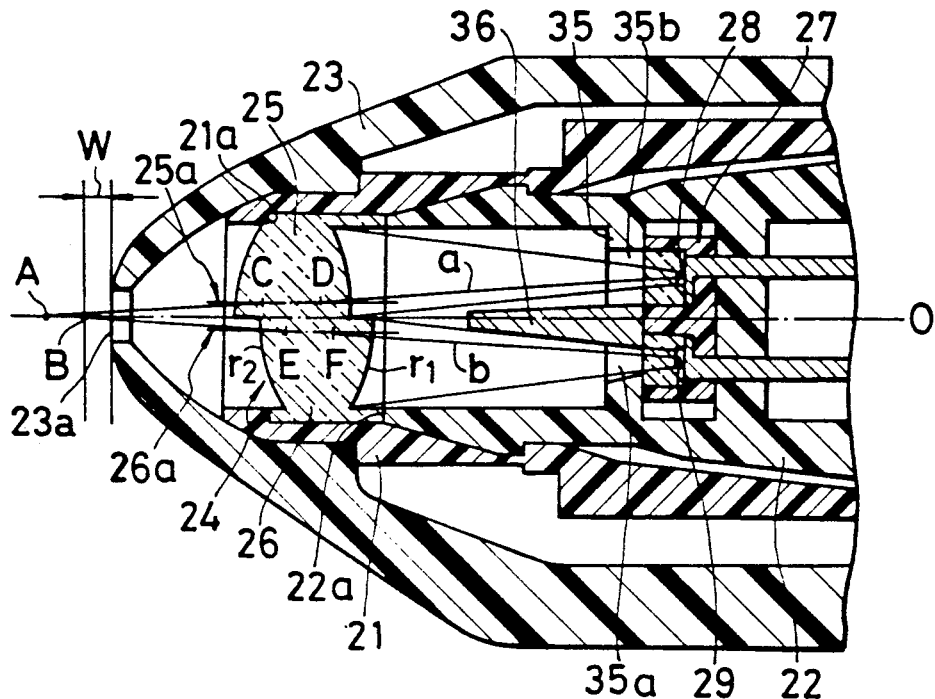
FIG. 2 is a sectional view taken along the line II—II in FIG. 1.
Figure 3:
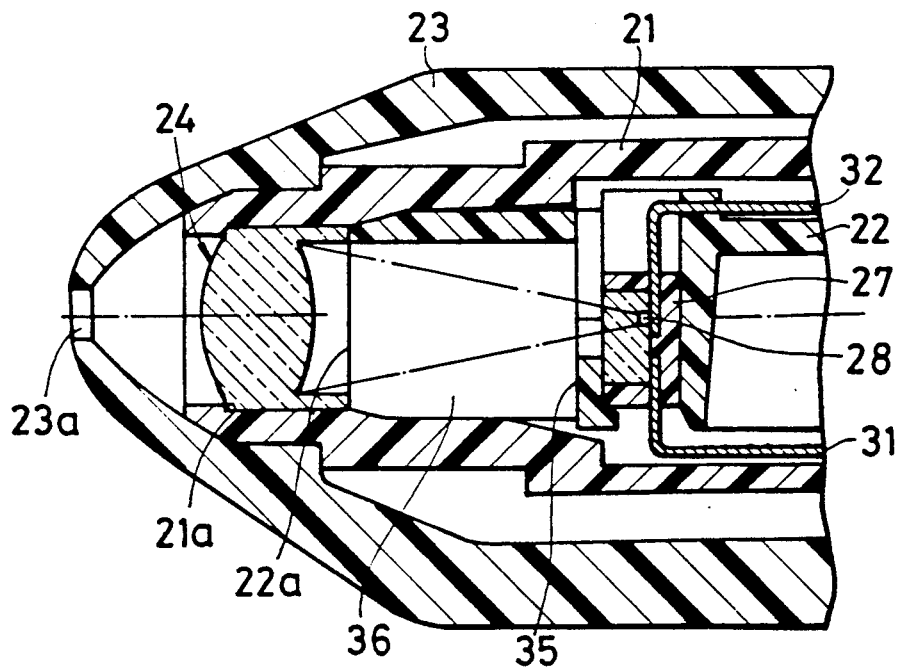
FIG. 3 is a sectional view taken along the line III—III in FIG. 1.

FIG. 1 is an exploded perspective view showing a first embodiment of an optical reader according to the present invention. FIG. 2 is a sectional view taken along the line II—II in FIG. 1 in the state that the optical detector is associated; and FIG. 3 is a sectional view taken along the line III—III.

In FIG. 1, reference numeral 21 designates a front case, and numeral 22 denotes a rear case. The rear case 22 is inserted from behind to the front case 21. As shown in FIGS. 2 and 3, the cases 21 and 22 engaged with each other are contained in a cover 23.

Reference numeral 24 designates an integral lens. The lens 24 is inserted from behind to the case 21, and held between the inner step 21a of the case 21 and the front end 22a of the case 22. The lens 24 is formed of molded plastic lens by integrating a light emitting side lens 25 and a photodetecting side lens 26. Reference character D denotes a first principal point of the lens 25, and character C depicts a second principal point. Symbol 25a indicates an optical axis of the lens 25. The surface of the lens 25 at the element side (right side in the drawing) is so constructed as to efficiently collect the light emitted from a light emitting element (a red light emitting diode) 28. For example, the surface of the element side is formed in a spherical surface that the principal surface around the optical axis 25a of the lens passing the principal points C-D is formed in a spherical surface with the optical axis 25a as a center in such a manner that a non-spherical surface is formed over the circumference so that a point on the optical axis 15a is a center of correcting the non-spherical surface to correct the periphery of the principal surface. Or, when the surface is of spherical shape, it is so formed that the interval between the curvature and the light emitting element 28 is optimum. The surface to be detected of the light emitting side lens 25 (left side in the drawing) is of non-spherical shape to efficiently emit a light to the surface to be detected on which a bar code is formed. The photodetecting side lens 26 is substantially symmetrical with respect to the light emitting side lens 25. Reference character F in the drawing designates a first principal point of the light emitting side lens 26, and character E is a second principal point. The optical axis 26a of the lens 26 is substantially parallel to the centeral axis O of the optical reader and the optical axis 25a of the lens 25. The lens 25 is projected forward from the lens 26, and both the lenses 25 and 26 are connected at a stepwise difference. The element side (left side in the drawing) of the lens 26 is so formed that the light reflected from a bar code is efficiently condensed to a photodetector (a phototransistor, photodiode, etc.) 29, and is formed in a non-spherical surface or a spherical surface that the optical axis 26a passing the principal point E-F as a center similarly to the surface of the lens 25 at the element side. The surface of the lens of the surface not to be detected (left side in the drawing) opposed to the surface is formed in a non-spherical surface to collect the reflected light from the surface to be detected on which a bar code is formed in an optical range.

Reference numeral 27 designates a photoreflector. The photoreflector 27 holds the light emitting element 28 and the photodetector 29 substantially on the same plane. As shown in FIG. 1, the photoreflector 27 is inserted in a holding opening 22b formed in the rear case 22. The photoreflector 27 has a plurality of terminals 31 and 32. A pair of terminals 31 are projected downward from the holding opening 22b of the case 22. A terminal opening 22c is formed at the case 22, and a pair of terminal boards 33 are held in the opening 22c. The pair of terminals 32 extended from the photoreflector 27 are fixed by soldering to the upper ends of the terminal boards 33 to be conducted.

Figure 8:
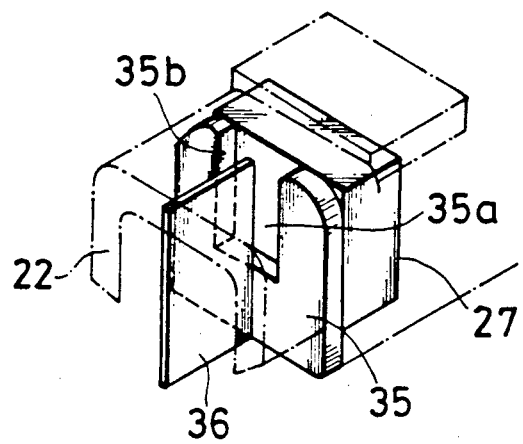
FIG. 8 is a perspective view showing the construction of a diaphragm plate.

As shown in FIG. 8, a diaphragm plate 35 disposed in front of the photoreflector 27 and a shielding plate 35 provided perpendicularly to the diaphragm plate 35 are provided in the rear case 22. Windows 35a and 35b are formed at the diaphragm plate 35. One window 35a is disposed in front of the photodetector 29 and formed smaller than the photodetecting area of the photodetector 29. The received luminous flux is reduced by the window 35a. The other window 35b is disposed in front of the light emitting element 28, and so opened as to be sufficiently larger than the light emitting area of the light emitting element 28. As shown in FIG. 2, the shielding plate 36 is extended forward at the intermediate between the light emitting element and the photodetector 29 so that the emitted luminous flux and the photodetected luminous flux do not interfere each other.

The reading operation of the optical reader according to the first embodiment described above will be described.

A range designated by reference character W in FIG. 2 is a range in which the recorded surface to be detected on which a bar code or the like is formed can be read. The light emitting and photodetecting side lenses 25 and 26 are disposed substantially in a symmetrical shape, and the lens 25 is projected forward from the lens 26. Therefore, the light emitting side focus point A focused at the light emitting element 28 by the lens 25 is set at a position displaced forward from the photodetecting side focus point B focused at the photodetector 29 by the lens 26. In this embodiment, as shown in FIG. 2, the light emitting side focus point A is set further forward from a readable range W.

Figure 4:
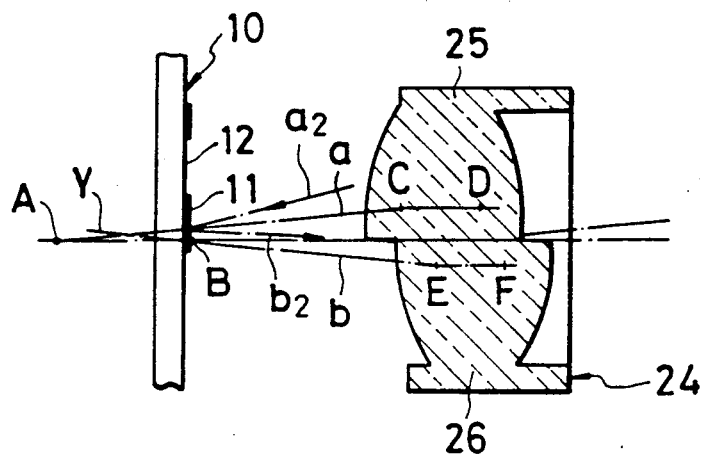
FIG. 4 is an explanatory view showing the reading operation of the optical reader according to the first embodiment.
Figure 5:
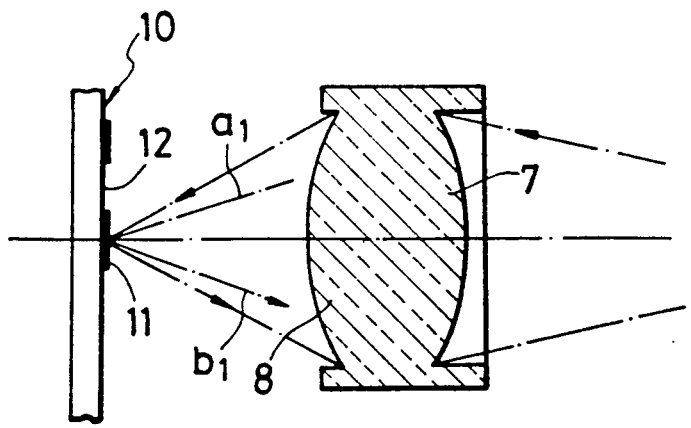
FIG. 5 is an explanatory view showing the reading operation of a conventional optical reader for the comparison with FIG. 4.
Figure 23:
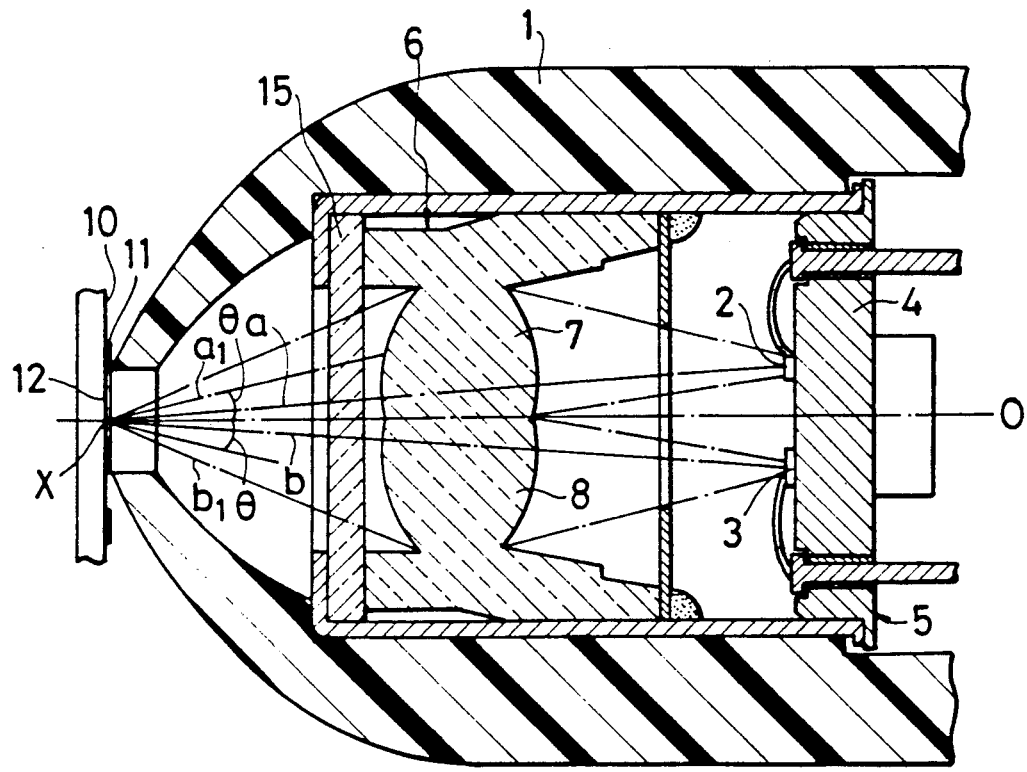
FIG. 23 is a sectional view showing a conventional example.
Figure 24:
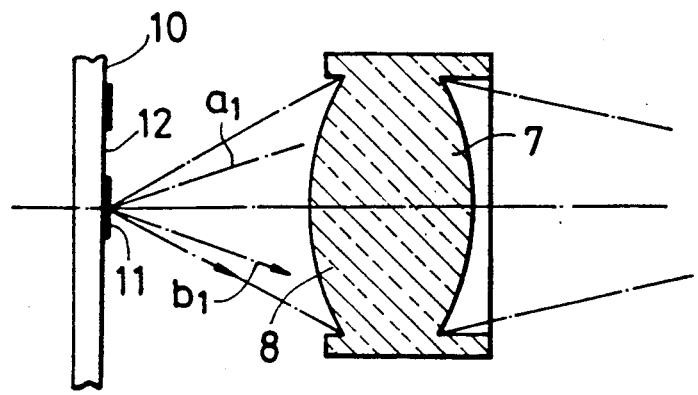
FIG. 24 is an explanatory view showing an optical reading operation of the conventional example.
Figure 25:
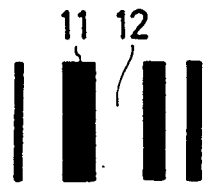
FIG. 25 is a plan view showing a bar code.

FIG. 4 shows the reading operation of the optical reader according to this embodiment, and FIG. 5 shows the reading operation of a conventional optical reader shown in FIG. 23. As shown in FIG. 4, since the light emitting side focus point A is formed forward from the photodetecting side focus point B in the optical reader according to this invention, when the surface 12 to be detected is disposed near the photodetecting side focus point B and the reading operation of the optical reader is executed, an image is not focused on the surface 10 to be detected by the light emitted from the light emitting element 28, and the luminous flux to be detected and emitted to the surface 10 to be detected becomes a defocused state. On the contrary, since the photodetecting side focus point B substantially coincides with the surface 10 to be detected, the light reflected on the surface 10 to be detected is effectively and efficiently read by the photodetector 29. When the light emitted from the light emitting element 28 is emitted to the surface 10 to be detected in the defocused state in this manner, the regular reflection light of the light reflected by the surface 10 to be detected is collected by the photodetecting side lens 26 so that the regular reflection light is scarcely detected by the photodetector 29. In other words, the crossing position Y of the principal light ray a of the light emitted from the light emitting element 28 (extended from the principal point C) and the principal light ray b directed toward the photodetector 29 (extended to the principal point E) is disposed between the light emitting side focus point A and the photodetecting side focus point B. The light emitted from the light emitting element 28 is easily collected by the photodetecting side lens 26 due to the regular reflection when the crossing position Y of the principal light rays a and b is located on the surface to be reflected (the surface to be detected). Since the crossing position Y of the principal light rays is disposed further forward from the actual surface to be reflected (the surface 10 to be detected) in this invention, the ratio of the regular reflection light reflected by the surface 10 to be detected of the light emitted from the light emitting element 28 to the light detected by the photodetector 29 is largely reduced. When this will be described conceptionally with reference to the drawings, since the crossing position Y of the principal light rays a and b is disposed forward (depth side) from the surface 10 to be detected in FIG. 4, even if the light ray a2 is, for example, regularly reflected by the black bar 11 of the surface 10 to be detected, i.e., even if the incident light of the light ray a2 to the black bar 11 becomes equal to the reflecting angle of the reflected light ray b2, the reflected light ray b2 is advanced in a direction that is not collected by the photodetecting side lens 26. Even if the reflected light ray b2 is incident to the photodetecting side lens 26, the reflected light ray b2 is propagated at a different angle from the detectable luminous flux at the principal light ray b of the photodetector 29 as a center. Thus, the reflected light ray b2 propagated toward the photodetecting side lens 26 is not always condensed to the photodetector 29 to be detected. On the contrary, in the conventional optical reader shown in FIG. 5, since the focus point of the light emitting element by the light emitting side lens 7 and the focus point of the photodetector by the photodetecting side lens 8 are disposed at the same position, when the surface 12 to be detected coincides with the focus point and the optical reader is disposed substantially perpendicularly to the surface 10 to be detected, the reflected light ray b1 is substantially effectively condensed by the photodetector by means of the photodetecting side lens 8 as the incident light ray a1 is regularly reflected. Thus, the regularly reflected light ray is detected at a high ratio by the photodetector 3. As apparent from the comparison with the conventional optical reader, the probability that the regularly reflected light on the recorded surface 10 is detected by the photodetector 29 is decreased. Therefore, even if there is the light ray regularly reflected by the black bar 11, the probability that the light is detected by the photodetector 29 is decreased. In this embodiment, since a distance is provided between the focus points A and B by displacing the light emitting side lens 25 and the photodetecting side lens 26, when the displaced distance is suppressed to a short length, it can prevent the detecting spot formed on the surface 10 to be detected, emitted by the light emitting element 28 from being excessively widened, and the range to be detected by the photodetector 29 may not be displaced from the spot. Therefore, the photodetecting efficiency of detecting the reflected light (mainly disordered reflected light) from the spot and the reading resolution of the bar code can be maintained at considerably high level.

Figure 6:
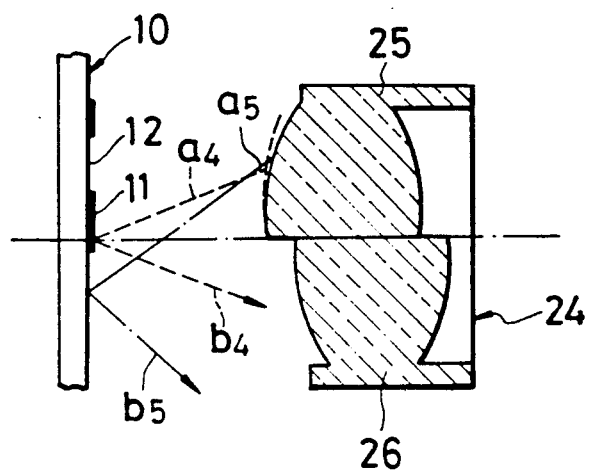
FIG. 6 is an explanatory view showing the reading operation when a light emitting side lens has a large spherical aberration.
Figure 7:
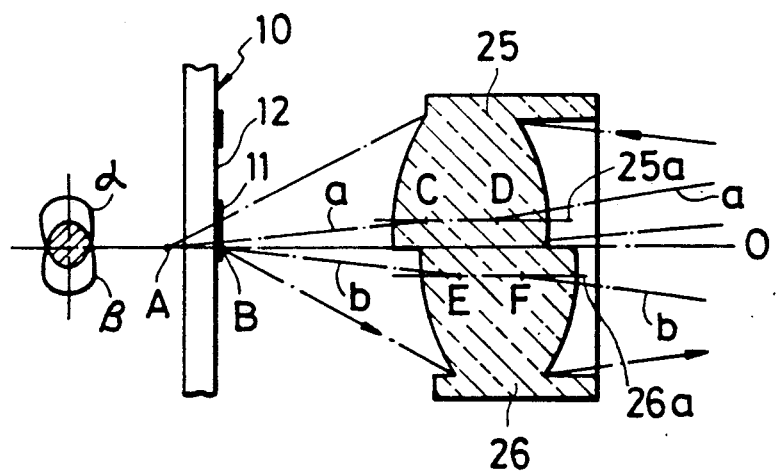
FIG. 7 is an explanatory view showing the operation when the optical axes of the light emitting and photodetecting side lenses are disposed in parallel.

In this embodiment, the light emitting and photodetecting side lenses 25 and 26 employ non-spherical lenses, and the surfaces to be detected of the lenses 25 and 26 (the left side surfaces of the drawings) are of non-spherical shape. The adverse influence of the regular reflection can be further reduced by using the light emitting side lens 25 having larger spherical aberration (having insufficient correction of spherical aberration by the non-spherical surface). FIG. 6 shows a non-spherical surface corrected for the spherical aberration of the light emitting side lens 25 by broken lines and a non-spherical surface in which its spherical aberration is insufficiently corrected by solid lines. As designated by the broken lines, when the correction of the spherical aberration is sufficient, a peripheral edge light ray passing the edge of the lens or an annular band light ray passing inside the edge of the lens is condensed near the focus point as designated by a4. Thus, the possibility that the regular reflection light b4 is detected by the photodetector 29 becomes high. However, when the non-spherical surface of the lens 25 is insufficiently corrected in its spherical aberration as designated by the solid lines (the spherical aberration is increased), the peripheral edge light ray or the annular band light ray a5 is condensed at the position largely separated from the focus point. Thus, even if the regular reflection light b5 is generated by the light ray a5, the possibility that the light ray b5 is collected by the photodetecting lens 26 to be detected by the photodetector 29 is reduced. In this manner, it can further prevent the reading accuracy from further decreasing due to the regular reflection light from the back bar 11 by insufficiently correcting the non-spherical surface of the light emitting side lens 26 to provide the lens for causing a large spherical aberration.

Further, in the embodiment described above, the optical axes 25a and 26a of the lenses 25 and 26 are formed in parallel with the center line O. Moreover, the principal light rays a and b cross near the light emitting side focus point A. Therefore, the principal light rays a and b are incident as oblique luminous flux to the lenses 25 and 25 having horizontal optical axes 5a and 26a. When the oblique luminous fluxes are incident to the lenses as described above, a coma aberration occurs, and the light spot formed on the surface 10 to be detected exhibits the shape that is widened toward the incident direction of the oblique luminous flux as designated by $\alpha$ and $\beta$. As a result, the superposing area (designated by hatching) of the detecting spot α formed by the light emitted from the light emitting element 28 and the detecting range β to be detected by the photodetector 29 is widened to enhance the detecting efficiency of the photodetector 29.

Figure 9:
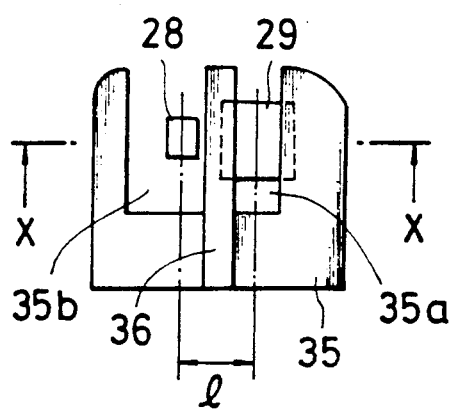
FIG. 9 is a front view of FIG. 8.
Figure 10:
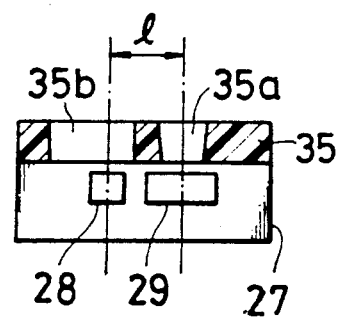
FIG. 10 is a sectional view taken along the line X—X of FIG. 9.

As designated in FIGS. 8 to 10, in this embodiment, the diaphragm for the photodetector 29 is formed by the window 25a formed at the diaphragm plate 35. The accuracy of the interval l between the light emitting range of the light emitting element 28 and the photodetecting range of the light emitting element 28 is obtained by providing the diaphragm. More specifically, since the opening of the diaphragm window 35a is narrower than the photodetecting area of the photodetector 29, even if the position of the photodetector 29 is displaced, the substantial position of the photodetecting range is not altered. Thus, the position of the photodetecting side focus point B can be always set constant by setting the distance l between the ranges of the light emitting element 28 and the photodetector 29 constantly and more particularly the distance between the center line O and the photodetecting range of the photodetector 29 constantly in FIG. 12 to prevent the superposing area of the spot α and the range β to be detected by the detecting light shown in FIG. 13 from varying. On the contrary, in FIG. 12, when the substantial interval l is varied (e.g., when the photodetecting range of the photodetector 29 is separated from the center line O, the photodetecting side focus point B is moved toward the light emitting side focus point A. Thus, as shown in FIG. 14, the range l to be detected in the surface 10 to be originally detected is moved in a direction of an arrow, and the detectable range (hatched portion) is narrowed. In other words, the maximum output position where the detecting level of the photodetector 29 is increased toward a direction A from the original surface to be detected so that the reading output becomes unstable. Therefore, the diaphragm is provided at the photodetector 29 side as in the embodiment of this invention to stabilize the maximum output position of the photodetector 29.

Figure 11:
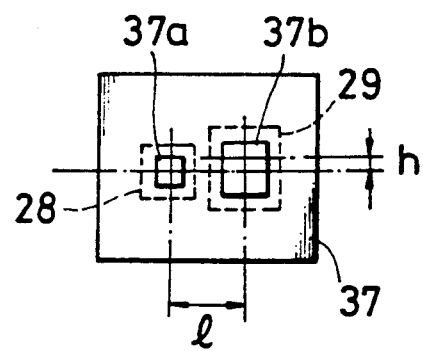
FIG. 11 is a front view showing a diaphragm plate according to another embodiment.

When the distance between the light emitting element 28 and the center line O is varied, the position of the light emitting side focus point A is altered, the spot shape formed on the surface 10 to be detected is varied, the quantity of the light of the spot is changed to cause the resolution to decrease. Therefore, the relative position distances l and h of the light emitting side diaphragm window 37a, the photodetecting side diaphragm window 37b are determined by using the diaphragm plate 37 as shown in FIG. 11. Further, when the opening areas of the diaphragm windows 37a and 37b are formed smaller than the light emitting element 28 and the photodetector 29, respectively, the positions of the light emitting range and the photodetecting range with respect to the center line O can be together stabilized. As a result, the position of the photodetecting side focus point B is stabilized to stabilize the maximum reading output position, and the position of the light emitting side focus point A is stabilized to stabilize the detecting spot to stabilize the quantity of the spot light to prevent the resolution from decreasing.

Figure 15:
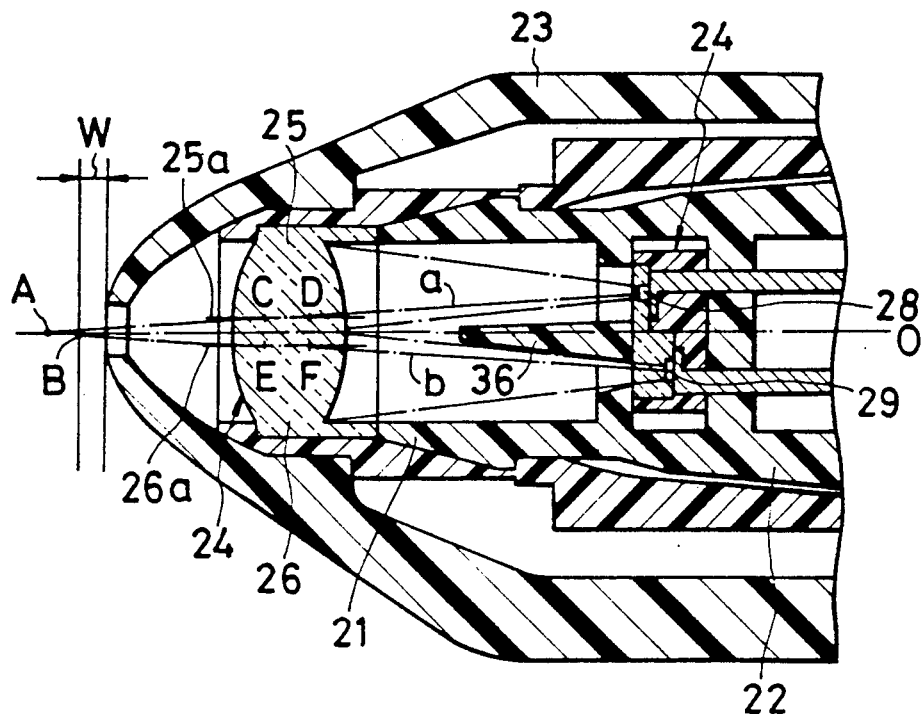
FIG. 15 is a sectional view showing a second embodiment of an optical reader according to the present invention.

FIG. 15 shows a second embodiment of the present invention.

In the second embodiment, the relative position between the light emitting side lens 25 and the photodetecting side lens 26 is not displaced in its optical axis direction, and two principal points C and D of the light emitting side lens 25 and two principal points E and F of the photodetecting side lens 26 are provided in parallel at the same position. The lenses 25 and 26 have the same focal distance and principal point position. On the other hand, a photoreflector 24 is different from that in the first embodiment, and a photodetector 29 is disposed at the position moved rearward in the rightward direction from the light emitting element 28. Therefore, the positions of the light emitting side focus point A and the photodetecting side focus point B are displaced by the difference of the positions of the light emitting element 28 and the photodetector 29, and substantially the same optical reader of the second embodiment as the first embodiment can be constructed.

In the second embodiment, since the light emitting side lens 25 and the photodetecting side lens 26 are integrated without a stepwise difference, when both the lenses 25 and 26 are integrally molded with plastic, the fabrication of its metal mold can be more ready than the first embodiment. Since no step is formed on the outer surface of the lens, no drawback that dusts are accumulated on the stepwise portion of the lens occurs.

Figure 16:
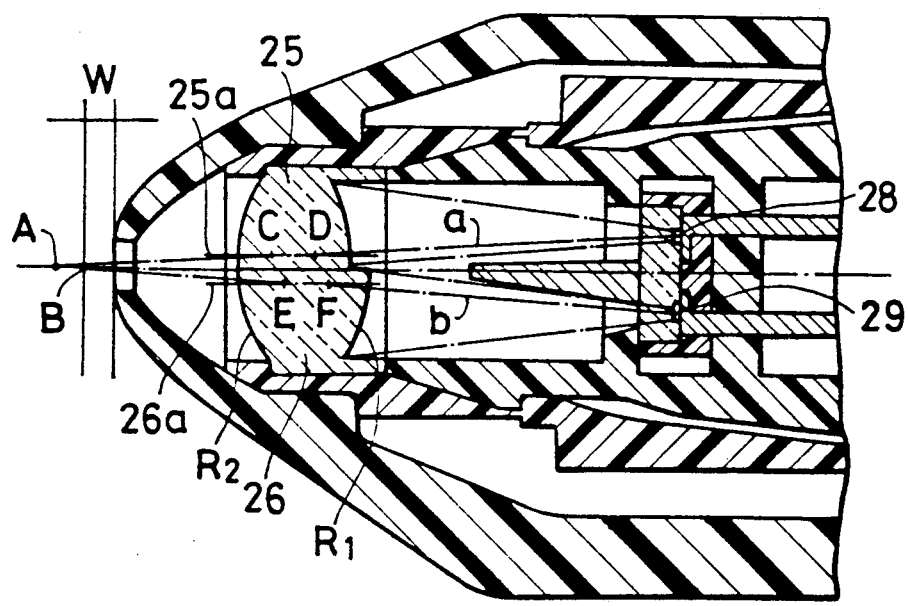
FIG. 16 is a sectional view showing a third embodiment of an optical reader according to the present invention.

FIG. 16 shows a third embodiment of an optical reader of this invention.

In the third embodiment, no stepwise difference is formed on the outer surface of the bonded portion between a light emitting side lens 25 and a photodetecting side lens 26 (on the left side surface in the drawing), and a light emitting element 28 and a photodetector 29 are disposed substantially in the same plane. Thus, the photodetecting side lens 26 is formed thicker than that in the first embodiment to displace the positions of the light emitting side focus point A and the photodetecting side focus point B by altering the positions of the positions E' and F' of the principal points.

The formulae of the lenses for displacing the positions of the focus points A and B by altering the thickness of the photodetecting side lens 26 will be described.

The focal distance f of the photodetecting side lens 26 of the first embodiment shown in FIG. 2 is obtained by the following formula:

$$1/f = (n-1)((1/r_1) - (1/r_2) + ((n-1)^2/n) \cdot (t/r_1 r_2)) \quad (1)$$

where n: Refractive index of a lens blank $r_1$: Radius of curvature of the center of photodetector side $r_2$: Radius of curvature of the center of the surface to be detected t: Central thickness of the lens The distance EF between the first principal point and the second principal point of the photodetecting side lens 26 in FIG. 2 is obtained by the following formula:

$$EF = f(1 - (f/n) \cdot ((1/f) - (n-1)^2/n \cdot (t/r_1 r_2))) \quad (2)$$

Figure 26:
FIG. 26 is a diagram showing an ideal waveform of a reading signal of a bar code.
Figure 27:
FIG. 27 is a diagram showing a disordered detected waveform by a regular reflection.
Figure 28:
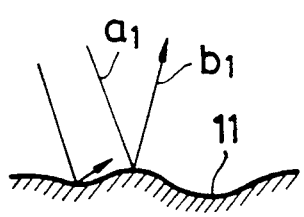
FIGS. 28 and 29 are sectional views of a surface to be detected on which a bar coder is formed.
Figure 29:
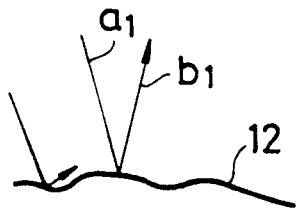
Figure 30:
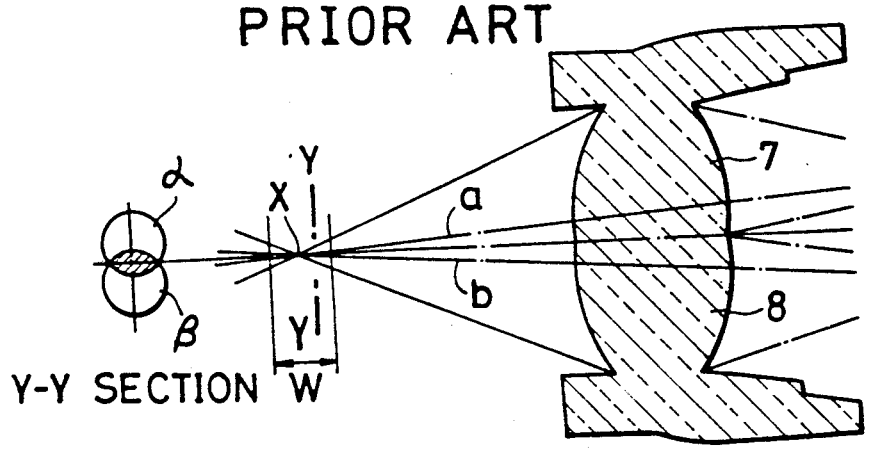
FIG. 30 is an explanatory view showing the operation.

In the photodetecting side lens 26 of the third embodiment of this invention in FIG. 26, $R_1$: radius of curvature of the center of photodetector side $R_2$: radius of curvature of the center of the surface to be detected T: central thickness of the lens $f_2$: focal distance.

In order to function the photodetecting side lens of FIG. 16 equivalently to the photodetecting side lens of FIG. 2, the following conditions may consist $$f = f_2$$

$$EF = EF$$

When these conditions are substituted in the formulae (1) and (2), the following formulae are obtained:

$$(1/r_1 r_2) = (T/R_2/R_2)$$

and $$(1/r_1) - (1/r_2) = (1/R_2) - (1/R_2)$$

When $R_1$, $R_2$ and T for satisfying the above formulae are determined at the photodetecting side lens in FIG. 16, the positions of the light emitting side focal point A and the photodetecting side focus point B can be displaced similarly to the first embodiment in FIG. 2.

In the third embodiment, since no stepwise difference is formed on the outer surface of the bonded portion of the light emitting side lens 25 and the photodetecting side lens 26, it can prevent dusts from accumulating on the outer surface of the lens. Since the light emitting element 28 and the photodetector 29 may be disposed on the same surface, the conventional photoreflector may be used.

Figure 17A:
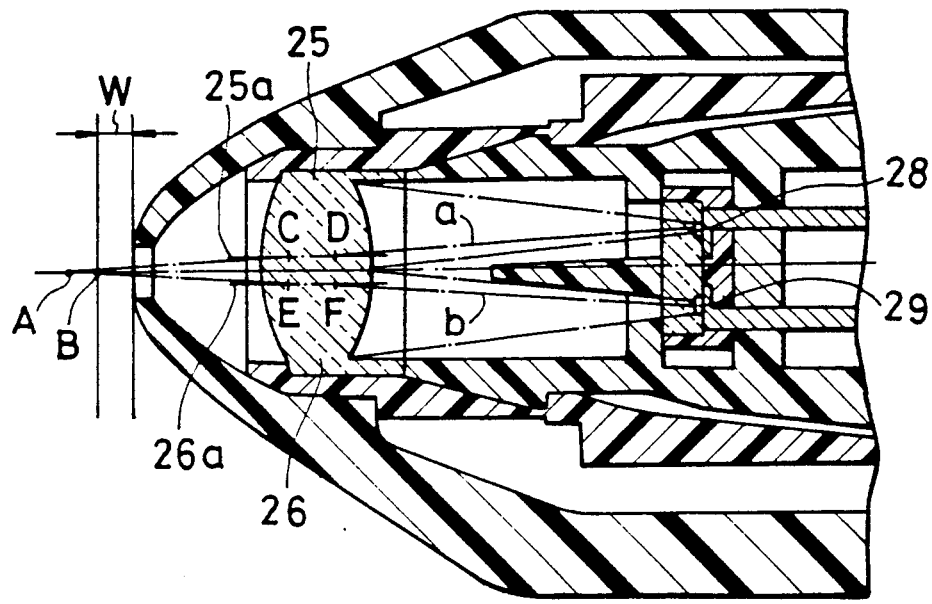
FIG. 17(A) is a sectional view showing a fourth embodiment of an optical reader according to the present invention.

FIG. 17(A) shows a fourth embodiment of this invention.

In this fourth embodiment, no stepwise difference is formed at a light emitting side lens 25 and a photodetecting side lens 26, and a light emitting element 28 and a photodetector 29 are disposed on the same plane. In this embodiment, the positions of the light emitting side focus point A and the photodetecting side focus point B can be displaced by altering the focal distances of the lenses 25 and 26.

Figure 17B:
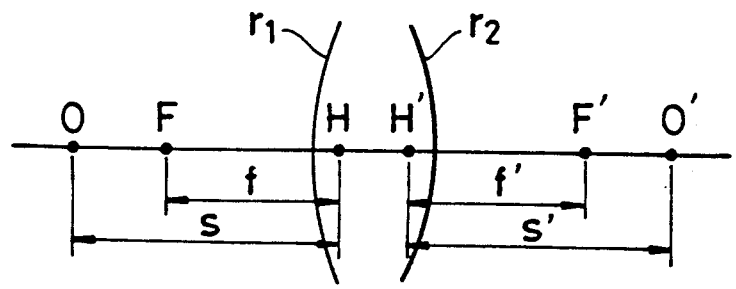
FIG. 17(B) is an explanatory view showing the operation of the optical/reader in FIG. 17(A)

More specifically, in FIG. 17(B), when a physical body O is focused at O' through a sole lens having a focal distance f, this relationship can be represented by the following formula:

$$(1/S') - (1/S) = 1/f = (-1/f) \quad (3)$$

In order to displace the light emitting side focus point A and the photodetecting side focus point B in the optical reader in FIG. 17(A), the conditions of the photodetecting lens 26 with respect to the photodetecting side lens 25 are necessary that:

(1) S is constant, and
(2) Si' is shorter than the light emitting side. In order to satisfy these conditions, it is understood from the formula (3) that the focal distance f is shortened. Therefore, the focal points A and B can be displaced by shortening the focal distance of the lens 26 from that of the lens 25.

Since the focal distance of the lens 26 is sufficient to be smaller by 0.1 mm than the light emitting side lens in the size of the optical system in the actual optical reader, the lenses 25 and 26 can be formed in structures having almost no stepwise difference.

Embodiments of an optical reader according to another aspect of this invention will be described in detail with reference to FIGS. 1 to 4 and 18(A), (B) to 22.

FIG. 1 is an exploded perspective view showing a first embodiment of an optical reader according to the present invention. FIG. 2 is a sectional view taken along the line II—II in FIG. 1 in the state that the optical detector is associated; and FIG. 3 is a sectional view taken along the line III—III.

In FIG. 1, reference numeral 21 designates a front case, and numeral 22 denotes a rear case. The rear case 22 is inserted from behind to the front case 21. As shown in FIGS. 2 and 3, the cases 21 and 22 engaged with each other are contained in a cover 23.

Reference numeral 24 designates an integral lens. The lens 24 is inserted from behind to the case 21, and held between the inner step 21a of the case 21 and the front end 22a of the case 22. The lens 24 is formed of molded plastic lens by integrating a light emitting side lens 25 and a photodetecting side lens 26. Reference character D in FIG. 2 denotes a first principal point of the lens 25, and character C depicts a second principal point. Symbol 25a indicates an optical axis of the lens 25. The surface of the lens 25 at the element side (right side in the drawing) is so constructed as to efficiently collect the light emitted from a light emitting element (a red light emitting diode) 28. For example, the surface of the element side is formed in a non-spherical or spherical surface that the optical axis 25a is disposed at the center. The surface to be detected of the light emitting side lens 25 (left side in the drawing) is of non-spherical or spherical shape to efficiently emit a light to the surface to be detected on which a bar code is formed. The photodetecting side lens 26 is substantially symmetrical with respect to the light emitting side lens 25. Reference character F in the drawing designates a first principal point of the light emitting side lens 25, and character E is a second principal point. The optical axis 26a of the lens 26 is substantially parallel to the centeral axis 0 of the optical reader and the optical axis 25a of the lens 25. The lens 25 is projected forward from the lens 26, and both the lenses 25 and 26 are connected at a stepwise difference. The element side (right side in the drawing) of the lens 26 is so formed that the light reflected from a bar code is efficiently condensed to a photodetector (a phototransistor, photodiode, etc.) 29, and is formed in a non-spherical surface or a spherical surface that the optical axis 26a passing the principal point E-F as a center. The surface of of the lens of the surface not to be detected (left side in the drawing) opposed to the surface is formed in a non-spherical or spherical surface to collect the reflected light from the surface to be detected on which a bar code is formed in an optical range.

Reference numeral 27 designates a photoreflector. The photoreflector 27 holds the light emitting element 28 and the photodetector 29 substantially on the same plane. As shown in FIG. 1, the photoreflector 27 is inserted in a holding opening 22b formed in the rear case 22. The photoreflector 27 has a plurality of terminals 31 and 32. A pair of terminals 31 are projected downward from the holding opening 22b of the case 22. A terminal opening 22c is formed at the case 22, and a pair of terminal boards 33 are held in the opening 22c. The pair of terminals 32 extended from the photoreflector 27 are fixed by soldering to the upper ends of the terminal boards 33 to be conducted.

The reading operation of the optical reader according to the first embodiment described above will be described.

A range designated by reference character W in FIG. 2 is a range in which the recorded surface to be detected on which a bar code or the like is formed can be read. The light emitting side lens 25 is projected forward from the lens 26. Therefore, the light emitting side focus point A focused at the light emitting element 28 by the lens 25 is set at a position displaced forward from the photodetecting side focus point B focused at the photodetector 29 by the lens 26.

As shown in FIG. 4, when the surface 10 to be detected is disposed near the photodetecting side focus point B and the reading operation of the optical reader is executed in the optical reader according to the present invention, the luminous flux emitted from the light emitting element 28 is not focused on the surface 10 to be detected but becomes a defocused state. When the light emitted from the light emitting element 28 is emitted in the defocused state in this manner, the regular reflection light of the light reflected by the surface 10 to be detected is collected by the photodetecting lens 26 to largely decrease the rate of the light detected by the photodetector 29.

In this embodiment, the lenses 25 and 26 are formed in spherical or non-spherical surface shape. For example, FIGS. 21 and 22 show two types of lens shapes adapted for the optical reader. The lenses 25 and 26 of these lens shapes are formed in the same shape.

In FIGS. 21 and 22, $R_1$ designates the radius of curvature of a vertex of the element side, $R_2$ designates the radius of curvature of a vertex of the surface to be detected, d is the thickness of the lens, and N is the refractive index, where K, D, E, F and G are non-spherical surface coefficient, K is conical constant, and D, E, F and G are 4-, 6-, 8- and 10-order non-spherical surface development coefficients.

The non-spherical surface shape formula will be described below.

$$X = \frac{\frac{Y^2}{R}}{1 + \sqrt{1 - (K + 1) \times \frac{Y^2}{R^2}}} + DY^4 + EY^6 + FY^8 + GY^{10}$$

where
R: radius of curvature of vertex
X: coordinates in thicknesswise direction of lens (optical axis direction)
Y: coordinates in a direction from the center of the lens toward a periphery (a direction perpendicular to the optical axis).

Figures 18A, 18B:
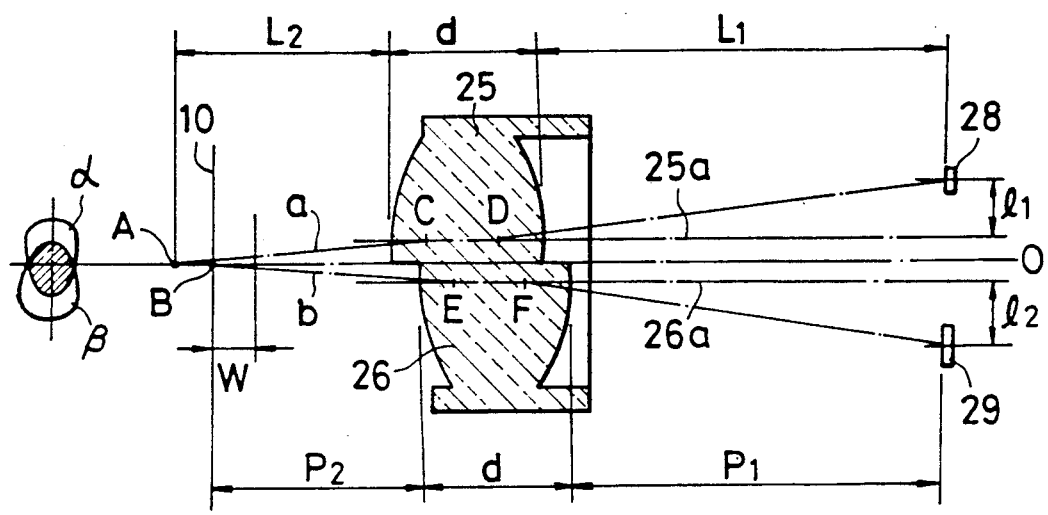
FIGS. 18(A) and 18(B) are views showing examples of positional relationships among a light emitting element, a light emitting side lens and its focus point and among a photodetector, a photodetecting side lens and its focus point when using a lens configuration in FIGS. 21 and 22.
Figure 19:
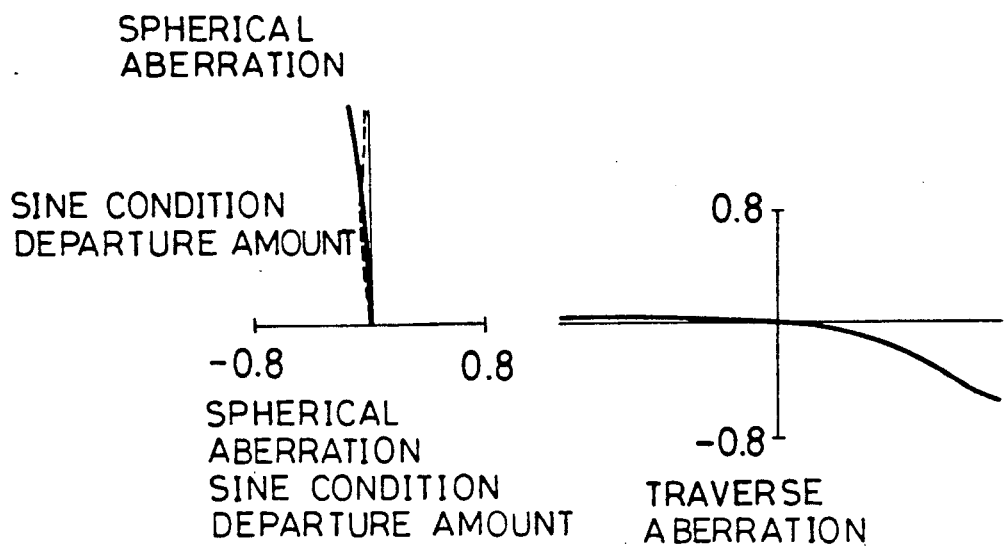
FIG. 19 is a view showing a spherical aberration, a traverse aberration and a departure amount of sine condition at a focus position obtained by the positional relationships shown in FIGS. 18(A) and 18(B)
Figure 20:
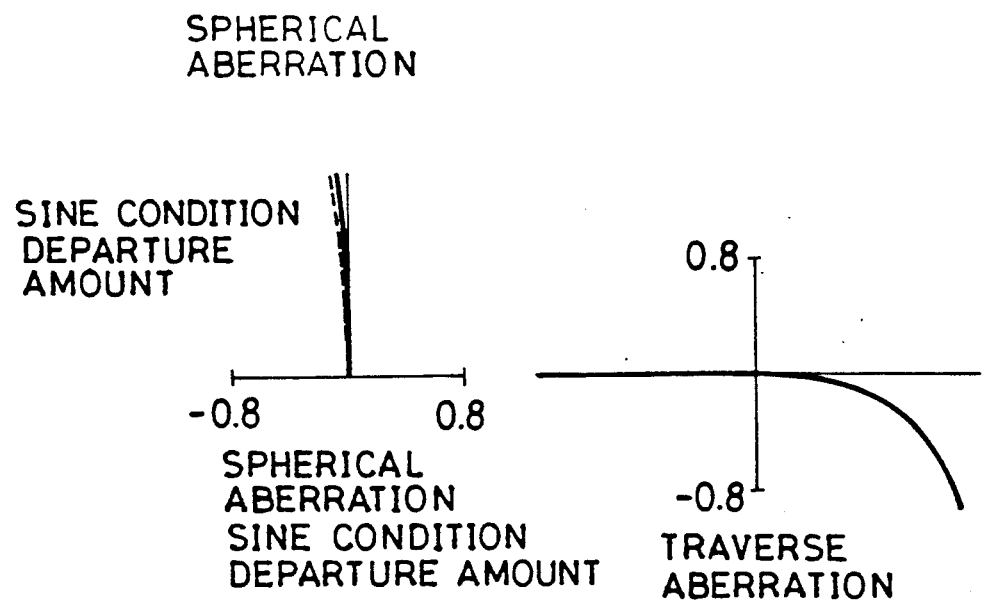
FIG. 20 is a view showing a spherical aberration, a traverse aberration and a departure amount of sine condition at a focus position obtained by the positional relationship shown in FIGS. 18(A) and 18(B) with a lens configuration in FIG. 22.

FIGS. 18(A) and 18(B) show the examples of the positional relationship among the light emitting element 28, the light emitting element side lens 25 and its focus point and the positional relationship among the photodetector 29, the photodetecting side lens and its focus point when using the lenses in 21 and 22. FIGS. 19 and 20 show the spherical aberration, the traverse aberration and sine condition departure amount at the focus position obtained in the positional relationships shown in FIGS. 18(A) and 18(B). Here, the state that there is the spherical aberration means that only a rotary symmetrical axis exists with respect to the luminous flux when considering the symmetry of the luminous flux near the image point and a symmetrical plane perpendicular to the rotary symmetrical axis does not exist. A defect of the luminous flux described above is called "a spherical aberration". The traverse aberration means the distance of the interval of the crossing point with the the principal optical axis as a reference and the crossing point of the light ray except that by numerically obtaining the crossing point of the gauss image surface of each light ray (the plane perpendicular to the optical axis passing the near axis focal point when the light ray is incident parallel to the optical axis) by means of tracing the light ray with the image angle and the wavelength as parameters. The traverse aberration represent all the spherical aberration, the coma aberration inclusive without sorting it to them.

Then, the conditions that the aberration near the image point on the axis is constant is called "sine conditions". The conditions are required for that the coma aberration over the general luminous flux is removed. Therefore, the sine condition departure amount is the quantity of predicting the coma aberration generated near the image point on the axis.

As shown in FIGS. 19 and 20, the spherical aberration, the traverse aberration and the sine condition departure amount are increased from the center of the lens toward the periphery. As shown in FIG. 5, the optical axis 25a of the light emitting side lens 25 and the optical axis 26a of the photodetecting side lens 26 are formed parallel to the center line O, and the principal light rays a and b are incident obliquely to the optical axis. With this state, the coma aberration is generated. The quantity of the coma aberration is represented here by the traverse aberration amount. In case of the non-spherical lens in which the spherical aberration and the coma aberration of the lens are corrected, the peripheral edge light ray passing the image of the lens or the annular band light ray passing the inside of the peripheral edge is condensed near the focus point. Therefore, the possibility that the regular reflection light is detected by the photodetector 29 is enhanced. However, when the spherical aberration and the coma aberration are insufficiently corrected in the non-spherical or spherical surface, the peripheral or annular band light ray is condensed at the position largely separated from the focus point. Thus, even if the regular reflection occurs, the regular reflection is collected by the lens 26, and the possibility of the detection of the photodetector 29 is reduced. In this manner, it can prevent the reading accuracy from reducing due to the regular reflection light by insufficiently correcting the non-spherical surface of the lens and providing the lens for generating large spherical aberration and coma aberration.

Since the spherical aberration and the coma aberration are generated, the range that the intensity of the light is strong near the surface to be detected is dispersed to widen the detectable range W to be read as shown in FIG. 5.

When the oblique luminous flux is incident to the lens to generate the coma aberration, the spot of the light formed on the surface 10 to be detected is formed in the shape widening in the incident direction of the oblique luminous flux as designated by $\alpha$ and $\beta$ in FIGS. 18(A) and 18(B). As a result, the superposing surface (designated by hatching) of the detecting spot $\alpha$ formed by the light emitted from the light emitting element 28 and the detecting range $\beta$ to be detected by the photodetector 29 is widened to enhance the detecting efficiency of the photodetector 29.

For example, as shown in FIGS. 18(A) and 18(B), in order to widen the detecting range in fact when the area of the photodetector 29 is approx. three times as large as that of the photodetector 28 and the magnification is approx. 0.6 times, the maximum traverse aberration amount at the focus positions of the lenses 25 and 26 is required to be increased approx. three times or more as large as the size of the image.

According to the first aspect of the present invention as described above, the light emitting side focus point is set at the position farther than the lens from the photodetecting side focus point. Therefore, when the surface to be detected on which a bar code is formed is read in the state substantially coincident with the position of the photodetecting side focus point, the ratio of detecting the light due to the regular reflection by the photodetector is reduced. Consequently, even if the regular reflection light exists from the black portion of the bar code, the possibility of photodetecting it is reduced to stabilize the photodetection signal. Since the light emitting element and the photodetector are disposed near at hand to integrate the light emitting side lens and the photodetecting side lens, the optical reader can be reduced in size. Since the optical dispersing member (15 in FIG. 23) is not necessarily used as the conventional optical reader, the photodetecting light quantity is not decreased to efficiently read it.

According to another aspect of the present invention as described above, the optical axes of the light emitting side lens and the photodetecting side lens are set in parallel and so disposed that the central positions of the light emitting element and the photodetector are disposed outside the extension lines of the optical axes. Therefore, the ratio of detecting the regular reflection light by the photodetector is reduced to stabilize the photodetection signal. Further, the detecting efficiency of the photodetector can be enhanced, and the readable range to be detected can be widened. Since the light emitting element and the photodetector are disposed near at hand so that the light emitting side lens and the photodetecting side lens can be integrally formed, the optical reader can be reduced in size.

What is claimed is:

1. An optical reader for detecting light reflected by a surface within a read region, comprising:
   a light emitting element;
   a first lens for directing light from said light emitting element to said read region, said first lens having a first optical axis and being adapted to focus said light at generally a first focus point off of said first optical axis;
   a photodetector; and
   a second lens for directing light from said read region to said photodetector, said second lens having a second optical axis parallel to said first optical axis and spaced therefrom, and being adapted to focus light from generally a second focus point off of said second optical axis at said photodetector;
   wherein said first and second focus points are spaced from each other.

2. An optical reader as in claim 1, wherein:
   said light emitting element and said photodetector are equidistant from said read region; and
   said first lens has a greater focal distance than said second lens.

3. An optical reader of claim 1, wherein:
   said light emitting element and said photodetector are disposed at the same distance from said read region;
   each of said lenses has two principal points, the distance between the principal points of each lens being the same for each of said lenses;
   said first and second lenses have the same focal distance; and
   said first lens is closer to said read region than said second lens.

4. An optical reader of claim 1, wherein:
   each of said lenses has a first principal point and a second principal point, the first principal points of said lenses being at the same distance from said read region and the second principal points of said lenses being at the same distance from said read region;
   said lenses have equal focal distances; and
   said light emitting element is closer to said first lens than said photodetector is to said second lens.

5. An optical reader as in claim 1, wherein:
   said first and second optical axes define a first plane passing through said first and second axes;
   a second plane passes through said first axis perpendicularly to said first plane;
   a third plane passes through said second axis perpendicularly to said first plane;
   said light emitting element is spaced from the second plane in a direction away from the third plane;
   said photodetector is spaced from the third plane in a direction away from the second plane;
   said first lens has a coma aberration affecting an image formed by light from said light emitting element in said read region;
   said second lens has a coma aberration, said second focus point substantially coinciding with said read region, and light received by said photodetector from said second focus point being affected by the coma aberration of said second lens; and
   said image intersects said second focus point.

6. An optical reader for detecting light reflected by a surface within a read region, comprising:
   a light emitting element;
   a first lens for directing light from said light emitting element to said read region, said first lens having a first optical axis and being adapted to focus said light at generally a first point;
   a photodetector; and
   a second lens for directing light from said read region to said photodetector, said second lens having a second optical axis parallel to said first optical axis and being adapted to focus light from generally a second point at said photodetector;
   wherein said first and second points are spaced from each other;
   said light emitting element and said photodetector are disposed at the same distance from said read region;
   each of said lenses has two principal points, the distance between the principal points of each lens being the same for each of said lenses;
   said first and second lenses having the same focal distance; and
   said first lens is closer to said read region than said second lens.

7. An optical reader for detecting light reflected by a surface within a read region, comprising:
   a light emitting element;
   a first lens for directing light from said light emitting element to said read region, said first lens having a first optical axis and being adapted to focus said light at generally a first point;
   a photodetector; and
   a second lens for directing light from said read region to said photodetector, said second lens having a second optical axis parallel to said first optical axis and being adapted to focus light from generally a second point at said photodetector;

wherein said first and second points are spaced from each other;

each of said lenses has a first principal point and a second principal point, the first principal points of said lenses being at the same distance from said read region and the second principal points of said lenses being at the same distance from said read region;

said lenses have equal focal distances; and said light emitting element is closer to said first lens than said photodetector is to said second lens.

8. An optical reader for detecting light reflected by a surface within a read region, comprising:

a light emitting element;

a first lens for directing light from said light emitting element to said read region, said first lens having a first optical axis and being adapted to focus said light at generally a first point;

a photodetector; and a second lens for directing light from said read region to said photodetector, said second lens having a second optical axis parallel to said first optical axis and being adapted to focus light from generally a second point at said photodetector;

wherein said first and second points are spaced from each other;

said first and second optical axes define a first plane passing through said first and second axes;

a second plane passes through said first axis perpendicularly to said first plane;

a third plane passes through said second axis perpendicularly to said first plane;

said light emitting element is spaced from the second plane in a direction away from the third plane;

said photodetector is spaced from the third plane in a direction away from the second plane;

said first lens has a coma aberration affecting an image formed by light from said light emitting element in said read region;

said second lens has a coma aberration, said second point substantially coinciding with said read region, and light received by said photodetector from said second point being affected by the coma aberration of said second lens; and said image intersects said second point.

9. An optical reader for detecting light reflected by a surface within a read region, comprising:

a light emitting element for emitting light towards said read region;

a first lens associated with said light emitting element, said first lens having a first optical axis and being disposed between said light emitting element and said read region for focusing emitted light towards said read region and forming an image within a region of said read region;

a light receiving element for detecting light; and a second lens associated with said light receiving element, said second lens having a second optical axis parallel to and spaced from said first optical axis and being disposed between said light receiving element and said read region for focusing light from said image region on said light receiving element;

wherein said first and second optical axes define a first plane passing through said first and second axes;

a second plane passes through said first axis perpendicularly to said first plane;

a third plane passes through said second axis perpendicularly to said first plane;

and wherein said second and third planes define a space between them, at least one of said light emitting element and light receiving element being outside said space and the lens associated therewith having a coma aberration.

10. An optical reader of claim 9, wherein:

said first lens being adapted to focus said light at generally a first focal point off of said first optical axis;

said second lens being adapted to focus light at generally a second focus point off of said second optical axis; and said first focus point is spaced from said second focus point.

* * * * *